United States Patent [19]

Van Valkenburg

[11] Patent Number: 4,866,873
[45] Date of Patent: Sep. 19, 1989

[54] FISHING POLE HOLDER APPARATUS AND METHOD

[76] Inventor: Kit Van Valkenburg, 2910 E. Bilby Rd., Tucson, Ariz. 85706

[21] Appl. No.: 285,588

[22] Filed: Dec. 16, 1988

[51] Int. Cl.⁴ ............................................. A01K 97/10
[52] U.S. Cl. ..................................... 43/21.1; 248/538
[58] Field of Search ............... 43/21.1, 18.1; 248/545, 248/538, 530, 532, 533, 535; 173/90, 91; 277/147

[56] References Cited

U.S. PATENT DOCUMENTS

| | | | |
|---|---|---|---|
| 1,521,265 | 12/1924 | Anderson | 173/91 |
| 2,293,305 | 8/1942 | Oldham | 43/21.2 |
| 2,423,933 | 7/1947 | Gosh | 248/538 |
| 2,517,937 | 8/1950 | Stanton | 248/533 |
| 2,629,985 | 3/1953 | McDowell | 173/91 |
| 3,162,970 | 12/1964 | Gould | 43/21.1 |
| 3,381,763 | 5/1968 | Matson | 173/91 |
| 3,519,234 | 7/1970 | Matson | 173/91 |
| 3,669,390 | 6/1972 | Nielson | 248/538 |
| 3,956,846 | 5/1976 | Kent | 43/21.2 |
| 4,124,190 | 11/1978 | Wheeler | 248/538 |
| 4,157,803 | 6/1979 | Mack | 248/538 |
| 4,557,409 | 12/1985 | Hecock et al. | 173/91 |
| 4,565,025 | 1/1986 | Behrle | 43/21.2 |
| 4,656,774 | 4/1987 | Terrill | 43/21.2 |

*Primary Examiner*—M. Jordan
*Attorney, Agent, or Firm*—Victor Flores; Harrry M. Weiss

[57] ABSTRACT

This invention discloses a fishing pole holder apparatus including a rod stake member, a slide hammer member and a fishing pole support bracket. The stake member is provided with an impact end member and an attachment portion for pivotally mounting the fishing pole support bracket. The impacting slide hammer is mechanically attached to the stake member and is used for imparting a force to the stake member. The fishing pole support bracket is attachable to the stake member for holding a fishing pole in a casted position and includes a bent rod piece integrally shaped having a pivotal attachment, a first pole support integral to the pivotal attachment and a second pole support integral to said first pole support. The first and second pole supports cradle the reel end of a fishing pole while the attachment portion provides horizontal angle flexibility for holding the pole.

2 Claims, 3 Drawing Sheets

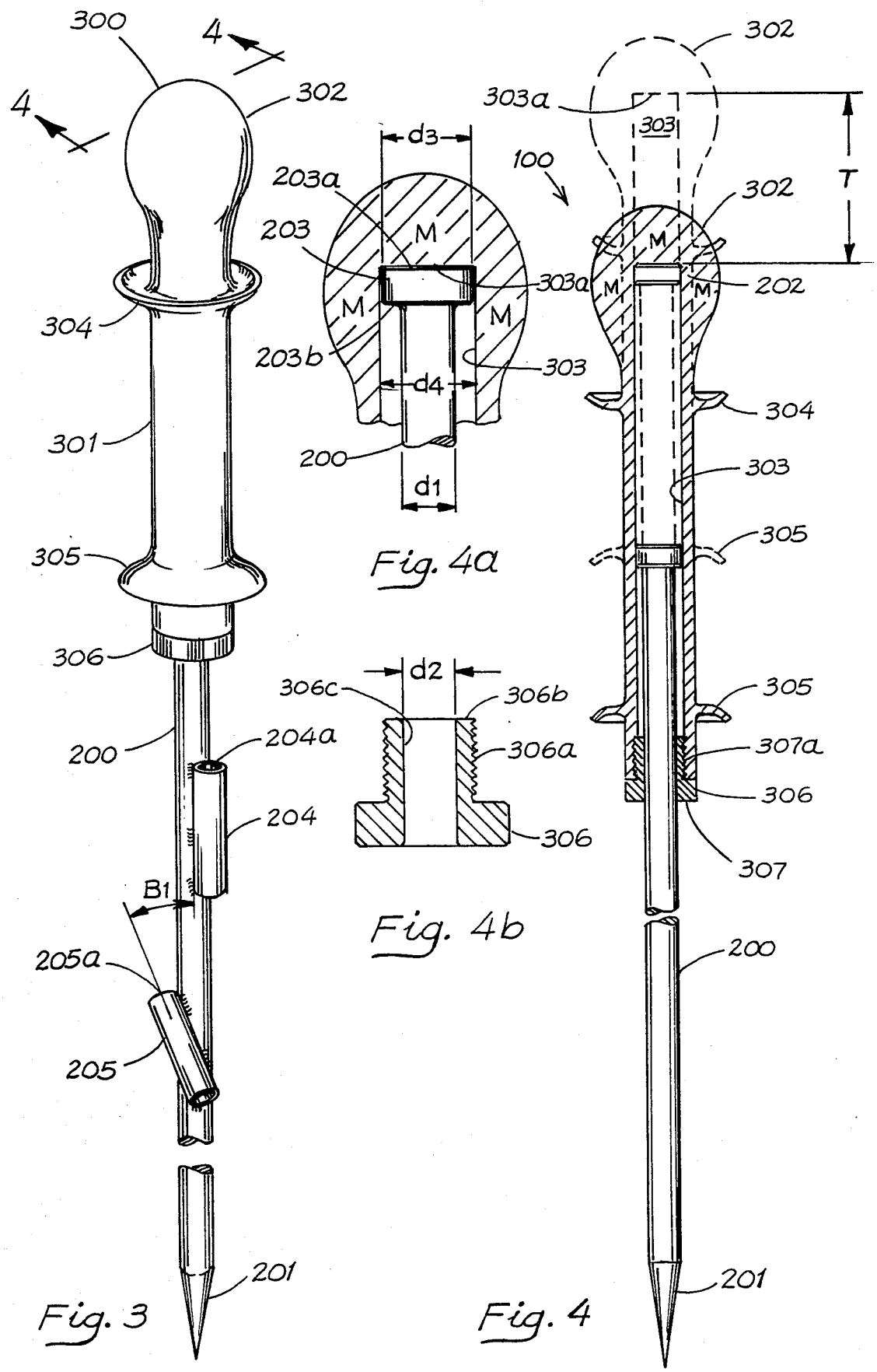

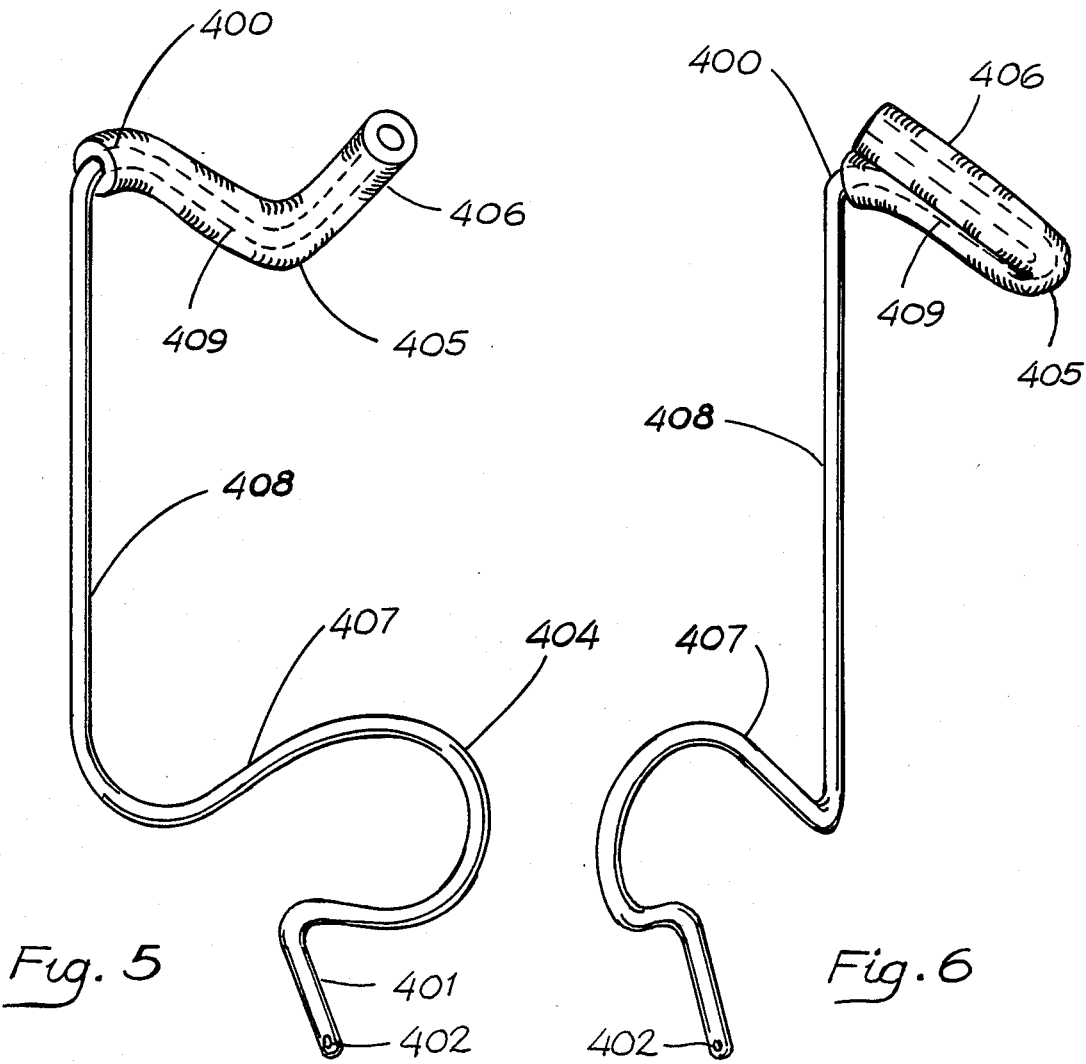

FISHING POLE HOLDER APPARATUS AND METHOD

FIELD OF THE INVENTION

The present invention relates to fishing pole holders and more particularly to fishing pole holders that are provided with detachable pole support brackets and that have impact means provided as an integral part of the fishing pole holder.

DESCRIPTION OF THE PRIOR ART

The prior art discloses fishing pole holders of the type that include a rod stake portion adapted with various means coupled to the upper end of the rod that provides a support for a fishing pole after being casted. Typical of the this teaching are the following U.S. Patent Nos.:

| U.S. Pat. No. | INVENTOR | DATE FILED | DATE ISSUED |
| --- | --- | --- | --- |
| 3,669,390 | Nielson | 05-14-70 | 06-13-72 |
| 3,162,970 | L. D. Gould | 07-24-63 | 12-29-64 |
| 2,423,933 | E. J. Gosh | 02-25-46 | 07-15-47 |
| 3,956,846 | Kent | 02-10-75 | 05-18-76 |
| 4,565,025 | Behrle | 12-08-83 | 01-21-86 |
| 4,656,774 | Terrill | 12-12-85 | 04-14-87 |

There are no known fishing pole holders that are provided with an impact means associated with the rod stake member and that have the rod stake member provided with attachment means that will allow the attachment of a detachable fishing pole support bracket member for supporting a fishing pole at various angles with the horizontal. Therefore, a need is seen to exist for a fishing pole apparatus that provides a user with a means to drive the apparatus into the ground at a fishing location and that has an attachment means for mounting a fishing pole support bracket for supporting a casted fishing pole at various angles with the horizontal.

Accordingly, it is a primary objective of the present invention to provide a fishing pole holder apparatus that provides a user a rod stake member that has an impact means mechanically attached to an upper end and that is provided with a plurality of attachment means for pivotally and detachably mounting a fishing pole support bracket that supports a casted fishing pole at various angles with the horizontal.

It is another object of the invention to provide a fishing pole support bracket that pivotally engages with the rod stake member adapted with the attachment means.

It is yet another object of the invention to provide a fishing pole holder apparatus whose impact means is a weighted slide hammer member and that has a fishing function of aiding in hooking a fish by virtue of the weighted slide hammer member counteracting and jerking back the bite of a fish.

SUMMARY OF THE INVENTION

The present invention provides a fishing pole holder apparatus designed to fulfil the aforementioned needs. The fishing pole holder apparatus of the present invention includes a rod stake member, a slide hammer impact means and a fishing pole support bracket means. The rod stake member is used for being inserted into the ground, the rod stake member is comprised of a substantially pointed end member, an impact end member and a plurality of attachment means for pivotally mounting a fishing pole support bracket means. The impact means is used for imparting a force to the impact end of the stake member. The impact means comprises a slide hammer weighed shaft provided with a hand grip portion having an elongated bore for receiving the impact end member of the stake member. The bore of the weighted shaft is adapted at a bottom end with a retaining means for retaining the impact end member within the bore. The fishing pole support bracket means is attachable to the stake member and is used for holding a casted fishing pole at a desired angle with the horizontal and to relieve the stress of manually holding the fishing pole. The fishing pole support bracket means is comprised of an integrally shaped piece having a pivotal attachment end, a first pole support integral to the pivotal attachment end and a second pole support integral to the first pole support.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 3 is a perspective view of the stake member illustrating the slide hammer and the pole support bracket attachment means.

FIG. 4 is a cross sectional view taken along the line 4—4 of FIG. 3 illustrating the slide hammer design.

FIG. 4a is a partial cross-sectional enlargement of the impact end of the stake member as fitted within the weighted portion of the slide hammer.

FIG. 4b is a cross-sectional enlargement of the retaining member used to retain the impact end within the bore of the slide hammer.

FIGS. 5 and 6 are perspective views of the fishing pole support bracket illustrating the respective pole supports that cradle the casted pole.

DESCRIPTION OF THE PREFERRED EMBODIMENTS

Figures 1, 2:
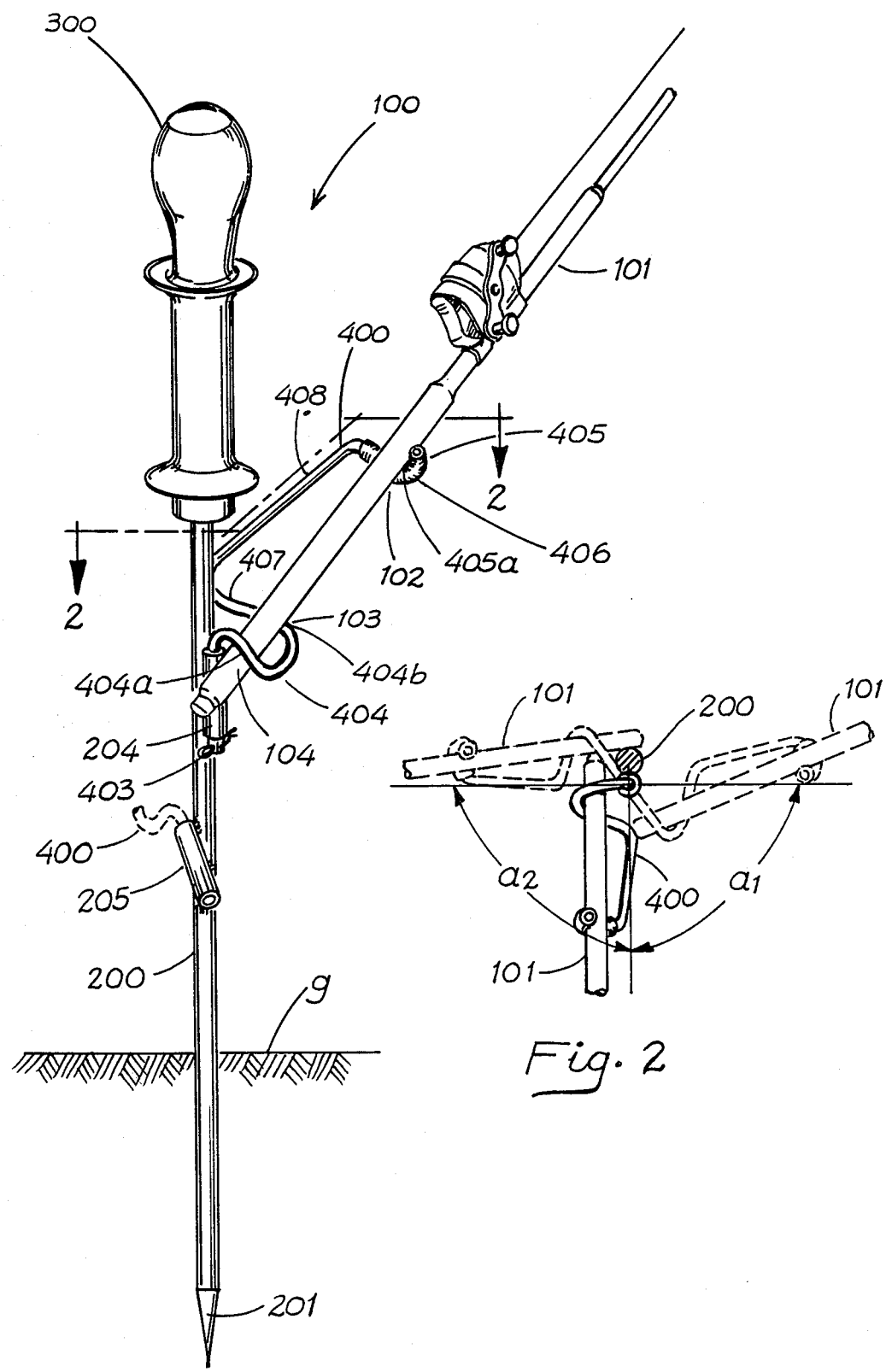
FIG. 1 is a perspective view of the present invention illustrating a stake member provided with a support bracket supporting a fishing pole in one casted position.
FIG. 2 is a cross-sectional view taken along the line 2—2 of FIG. 1 illustrating the pivotal action of the pole support bracket.

Referring now to FIGS. 1,3 and 4 where the present invention is shown adapted in the form of a fishing pole holder apparatus 100 comprised of a substantially rigid rod means 200 used for inserting into the ground g. Rod means 200 is shown comprising a lower end member 201, and upper end member 202 and an attachment means 204, 205 for pivotally mounting a fishing pole support bracket means 400.

Still referring to FIGS. 1,3, 4, apparatus 100 also includes an impact means 300 for imparting a force on rod means 200 and travels up and down a distance T to impact upon impact head 203 on either surface 203a when driving the rod means into the ground or surface 203b when urging the rod means out of the ground. Impact means 300 comprises a weighed slide hammer shaft 302 having a mass M provided with a hand grip portion 301 having stops 304,305 and having an elongated bore 303 for receiving upper end member 202. Bore 303 is adapted at a bottom end 307 of impact means 300 with a retaining means 306 for retaining upper end member 202 within bore 303. Bore 303 is designed having an inner impact end 303a that comes into contact with upper impact surface 203a. Retaining means 306 is preferably a threaded retainer nut having threads 306a that engage with threads 307a after having received upper end 202 within bore 303 and an impact surface 306b that come into contact with impact surface 203b of impact head 203. Bore 303 is designed having an inner diameter d4 that will accommodate the outer diameter d3 of impact head 203, see FIG. 4a. Similarly, the opening 306c on retainer means 306 must have a diameter d2 that will accommodate the diameter d1 of rod means 200, see FIG. 4b.

As best seen in FIGS. 1, 2, 5 and 6, apparatus 100 also comprises a fishing pole support bracket means 400 attachable to rod means 200 for holding a fishing pole 101 in a casted position as shown in FIG. 1. Fishing pole support bracket means 400 comprises a piece integrally shaped having a pivotal attachment end 401 provided with a keeper opening 402 for receiving keeper 403, a first pole support 404 integral to pivotal attachment end 401 and a first offset portion 407 integral with an extending portion 408 and a second pole support 405 integral to first pole support 404 and being integrally connected by means of second offset portion 409. First pole support 404 being adapted with an upper retainer portion 404a for holding an end portion 104 of fishing pole 101,an upper retainer portion 404b for supporting portion 103 of fishing pole 101. Second pole support 405 being adapted with a cradle portion 405a for supporting fishing pole portion 102 and a friction tubing 406 that aids in supporting fishing pole portion 101. FIG. 3 shows attachment means 204, 205 as comprising a first attachment means 204 having an insert end 204a for receiving pivotal attachment end 401 for maintaining fishing pole 101 at a first angle with the horizontal and second attachment means 205 having insert end 205a for receiving pivotal attachment end 401 for maintaining fishing pole 101 at a second angle with the horizontal, this angle variation being accomplished by the relative fixed location of the attachment means 204, 205 with respect to the body of rod means 200, this displacement angle being zero for attachment means 204 and being designated B1 for attachment means 205. It should be understood that the number and location of the attachment means 204,205 may vary according to the particular design being produced. As seen in FIG. 1 and 2, pivotal attachment end 401 being detachably mounted to attachment means 204,205 to allow support bracket 400 to be rotated as shown by arrows a1 and a2 for positioning fishing pole 101 at a desired and favorite fishing spot.

In operation, fishing pole holder apparatus 100 is carried to a favorite fishing spot along with fishing pole and other essential gear. Once selecting the fishing spot the fisherman positions the end 201 on the ground and proceeds to impart a driving force using slide hammer impact means 400. Once the rod means is in place the fisherman can insert pivotal attachment end 401 into a selected attachment means 204,205 for supporting the fishing pole after being casted. The fishing pole apparatus 100 supports and secures the fishing pole upon catching a fish. The weighted slide hammer portion will aid in hooking a fish due to a counteracting force on the fishing line that will jerk back instantly upon any relaxation of the line by a fish. The slide hammer 400 may be used to impart an upward force to pull the rod means 200 from the ground.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

I claim:

1. A fishing pole holder apparatus said fishing pole apparatus comprising:
   (a) a substantially rigid rod means for inserting into the ground;
   (b) an impact means for imparting a force to said rod means, said impact means comprises a slide hammer coupled to said rod means for imparting downward force to insert said rod means into the ground and for imparting upward force to extract said rod means from the ground, said slide hammer comprising:
   a weighed shaft provided with a hand grip portion having an elongated bore for receiving an impact end member of said rod means and a retaining member adapted to fit at a bottom end of said bore for retaining said impact end member within said bore, said bore and said retaining member each are adapted with an impact end; and
   (c) a fishing pole support bracket means attachable to said rod means for holding a fishing pole in a casted position.

2. A method of holding a fishing pole in a cast position, said method comprising the steps of:
   (a) providing a fishing pole holder apparatus, said apparatus comprising:
      (i) a substantially rigid rod means for inserting into the ground, said rod means comprising an end member, an impact end member and an attachment means for pivotally mounting a fishing pole support bracket means,
      (ii) an impact means for imparting a force to said rod means, said impact means comprises a weighed shaft provided with a hand grip portion having an elongated bore for receiving said impact end member, said bore being adapted at a bottom end with a retaining means for retaining said impact end member within said bore and
      (iii) a fishing pole support bracket means attachable to said rod means for holding a fishing pole in a casted position, said fishing pole support bracket means comprising a piece integrally shaped having a pivotal attachment end, a first pole support integral to said pivotal attachment end and a second pole support integral to said first pole support;
   (b) imparting a force upon said rod means using said impact means for driving said end member into the ground at a fishing location; and
   (c) positioning said fishing pole support bracket means onto said attachment means for holding a casted fishing pole at a desired angle with the horizontal.

* * * * *